Patented May 8, 1951

2,551,674

UNITED STATES PATENT OFFICE 2,551,674

MANUFACTURE OF BETA-PHENYLPROPIONIC ACID

John C. Hillyer and James T. Edmonds, Bartlesville, Okla., assignors to Phillips Petroleum Company, a corporation of Delaware No Drawing. Application August 22, 1949, Serial No. 111,768

14 Claims. (Cl. 260—515)

This invention relates to the manufacture of beta-phenylpropionic acid. In one embodiment, this invention relates to the utilization of novel starting materials in the production of beta-phenylpropionic acid. In another embodiment this invention relates to the manufacture of beta-phenylpropionic acid from a by-product material of an extractive distillation process employing furfural as a selective solvent in the recovery of butadiene from a butene-butadiene hydrocarbon mixture.

Beta-phenylpropionic acid has special utility as an intermediate in the drug and dye industry, and in various chemical syntheses. Heretofore, a principal method for the synthesis of beta-phenylpropionic acid has been its derivation from cinnamic acid. While cinnamic acid is a well-known compound, its supply is not plentiful, and it is normally available only at a price higher than that which is economically feasible for its use in the commercial development of its derivatives.

Other synthesis routes for production of beta-phenylpropionic acid include the reaction of benzyl acetate in the presence of sodium to form benzyl phenyl propionate which upon hydrolysis yields beta-phenylpropionic acid, and the controlled oxidation of a phenyl propyl alcohol or aldehyde. However, these and other known syntheses of beta-phenylpropionic acid are commercially unattractive because the starting materials are generally available in limited amounts and at unjustifiably high cost. Furthermore, these known methods, essentially laboratory operations, are not readily adaptable to commercial production.

Our invention is concerned with the utilization of novel low-cost starting materials in a new and efficient process for the manufacture of beta-phenylpropionic acid.

An object of our invention is to provide a process for the manufacture of beta-phenylpropionic acid.

Another object of our invention is to provide for the utilization of furfural, water, and butadiene in the production of a novel low-cost starting material for the manufacture of beta-phenylpropionic acid.

Another object is to provide a process wherein the condensation product of butadiene, water, and furfural is subjected to dehydration conditions to form beta-phenylpropionic acid.

Other objects will be apparent to those skilled in the art from the accompanying discussion and disclosure.

In accordance with our invention, beta-phenylpropionic acid is prepared by a dehydration of a lactone prepared by reacting aqueous furfural with butadiene. In this reaction one molecule each of furfural, butadiene, and water react together to form a lactone having the empirical formula $C_9H_{12}O_3$, the resulting reaction product being a solid, crystalline material which will be discussed in more detail hereinafter. When this lactone, or a fraction comprising it, is subjected to dehydration, as disclosed herein, beta-phenylpropionic acid can be recovered from the resulting reaction mixture. Various known dehydrating agents may be employed, among which are dehydrating acids, particularly sulfuric acid, phosphoric acid, oxalic acid, toluene sulfonic acid, and xylene sulfonic acid; alkali metal acid sulfates such as potassium hydrogen sulfate; organic acid anhydrides such as acetic anhydride and oxalic acid anhydride; and the like. Reaction temperatures generally in the range of from 200–350° F. are utilized in the practice of the dehydrating step of our invention although temperatures within the limits of 150–400° F. can be employed, if desired. Elevated pressures may be utilized but are not necessary. Reaction times of 2 to 40 hours may be employed, with 5 to 30 hours being preferred.

Generally we have prepared the lactone starting material above referred to by the interaction of butadiene, furfural, and water. This lactone material is a condensation product of butadiene, water, and furfural. A preferred procedure for the preparation of this lactone material is illustrated with a reaction system comprising furfural and from 1–50 per cent water, and 3–50 per cent butadiene, based on the weight of furfural. The reactant materials for such a system are charged to an autoclave and maintained at a temperature generally within the range of from about 200–300° F. for a reaction time from about 5 to about 125 hours. Unchanged reactants and any butadiene polymer are removed from the resulting reaction product and the higher boiling portion is fractionated under reduced pressure, i. e., preferably below 5 mm. of mercury, to recover the lactone starting material of our invention.

Higher temperatures, i. e., above about 300° F., accelerate undesirable secondary condensations during the lactone preparation step, above described, to an extent that they generally should be avoided. While a good quality lactone product can be obtained at relatively low temperature, operations below about 160° F. usually require substantially extended time. Pressures are, in general, not critical, and while effective conversion is usually obtained at the pressures normally developed at the operating temperature, they may be varied to any desired level such as by admission of nitrogen or other inert gas. It is preferred to have the furfural-butadiene-water reactants present in the reaction zone primarily in liquid phase. Distillation of the residual lactone-containing product under reduced pressure conditions below about 5 mm. of mercury absolute, is preferred, since substantial losses through secondary condensations, pyrolytic decomposition, and the like, usually result from the higher temperatures required when employing fractionation at higher distillation pressures, particularly a pressure as high as 1 atmosphere.

The lactone starting material can be obtained as a by-product of an extractive distillation process involving the use of furfural as a selective solvent in the separation of butadiene from a butadiene-butene hydrocarbon mixture undergoing fractional distillation in a distillation column. In such a process the butadiene-butene stream is contacted with furfural generally containing from 4-6 per cent water. Temperatures in various parts of the extractive distillation system range up to about 325° F., and the total contact time of butadiene, water, and furfural in the extractive distillation column is sufficiently long to provide for some appreciable "side reaction," or condensation, of furfural with water and butadiene, and the concomitant formation of some lactone by-product. The magnitude of such extractive distillation operations is such that large volumes of furfural are in constant circulation in the system, and thus even a low conversion of furfural to the lactone provides large amounts of the lactone product that can be utilized as a starting material in the process of our invention.

In the separation of butadiene from a butene stream in accordance with the extractive distillation procedure above referred to, it is generally customary to divert a small proportion, usually about 1 or 2 per cent of the circulating furfural stream, to a furfural rerun system, generally a steam or vacuum re-distillation system, for the purpose of removing by-product furfural polymers. In such a rerun system, the furfural-butadiene-water reaction product is separated from the furfural, as a part of a tarry bottoms product, containing large amounts of resinous furfural polymer together with certain aldehydic products of furfural-butadiene reaction, and the lactone condensate that we utilize as a starting material in the practice of our invention. Separation of this latter lactone material from the tar can be effected by a high vacuum distillation, generally at about 1 mm. pressure, or less, while employing a kettle temperature preferably in the range of from 150-250° F. The lactone condensate fraction obtained in this manner is free from furfural polymer and from at least a major proportion of aldehyde by-product, and is generally at least partially crystalline.

Steam distillation, when used in the removal of tar from the furfural side stream, provides large amounts of water condensate, which collect with the bottoms product. The aqueous phase thus formed carries in solution a large proportion of the lactone by-product, which can be recovered by distillation.

In a specific embodiment of our invention, a lactone of the type above referred to, is heated at a temperature within the range of 300-350° F. together with phosphoric acid of 80 to 90 per cent strength and a small amount of water, such as from 1-5 per cent, as a partial solvent. The heating is continued for from 15-36 hours, such heating periods more generally ranging from 20-30 hours. At the end of the heating period, the reaction mixture is cooled, and an oil layer and water layer separate. Crystalline beta-phenylpropionic acid is then recovered from the oil layer thus separated. It is often advantageous to add a small amount of water to the cooled reaction mixture to aid in the separation of the oil layer. Similar conditions are employed when using other dehydrating agents, such as those already named.

In another embodiment of our invention, the lactone is dissolved in xylene, and xylene sulfonic acid is added to the xylene solution in a weight ratio to the lactone generally within the limits of 0.01:1 to 10:1. The solution is refluxed at a boiling temperature of about 270-290° F. for a period of from 5-10 hours. The xylene is then removed from the resulting reaction mixture by distillation. An oil layer, containing beta-phenylpropionic acid product, and an acid layer separate from the residual xylene-free distillation product. The oil layer is removed and distilled under reduced pressure at a temperature generally within the range of from 250-400° F., preferably at a distillation pressure below about 2 mm. mercury, to recover the desired product.

It is a feature of our invention that it is unnecessary to utilize the lactone reactant in a high state of purity, thus eliminating the cost of a final purification that would otherwise be required. We have found that we can use a crude lactone-containing fraction recovered as a product of condensation of butadiene, water, and furfural, conducted under preparation conditions already discussed herein, or effected as a side reaction in an extractive distillation method of the type already discussed. This feature is particularly advantageous when utilizing the by-product material obtained from the furfural purification step already described. The tarry phase from the extractive distillation process, when distilled under reduced pressure, yields the lactone product together with some aldehydic materials, and these products can be readily separated to isolate the lactone in any desired purity. However, since the aldehydic by-product materials present in such a lactone-containing fraction do not enter into the dehydration reaction of our invention, and since they do not affect the reaction in any way, it is advantageous, from an economics stand point, to permit their presence in this reaction, thereby eliminating purification costs.

Recovery of a lactone-containing fraction from the steam condensate, when steam distillation is employed in the furfural rerun step, may be effected by evaporation of the water, and the residual product may be utilized as our starting material. However when desired, the residual product from such steam-condensate distillation may be further purified by means of solvent extraction, with a selective solvent such as acetone for example, to remove the lactone product in any desired degree of purity.

We have found further that we can, when desired, concentrate only a portion of the aqueous condensate from the furfural rerun system, and utilize a resulting water-containing residue as our starting material. Accordingly, it is unnecessary to completely dry such a crude fraction for our use. This feature is important in view of the fact that such crude fractions are quite hygroscopic and are more difficult to handle in the anhydrous state. Furthermore, we have found the presence of water to be beneficial in avoiding charring of the reactant material.

Recovery of beta-phenylpropionic acid from the reaction product can be effected by any one of several known methods, particularly by means of steam distillation. When utilizing the lactone starting material of purity, such as from 60-80 per cent, or higher, and carrying the reaction to a high degree of conversion, the oil layer contains a beta-phenylpropionic acid in a high percentage such that it will crystallize upon cooling. Final purification is effected by recrystallization of the beta-phenylpropionic acid product, from water, or water containing a small amount of ethanol. When pure, beta-phenylpropionic acid is a white crystalline solid, melting at 119° F.

Our invention is illustrated by the following examples. The reactants, their proportions, and other specific ingredients are presented as being typical and should not be construed to limit the invention unduly.

Example I

Freshly steam distilled furfural containing five per cent by weight of water was charged to a steel reaction vessel. Sufficient 1,3-butadiene was added to give a butadiene concentration of 4.0 per cent in the reaction mixture. The composition of the charge material was

| | Parts by weight |
|---|---|
| Furfural | 91.2 |
| Butadiene | 4.0 |
| Water | 4.8 |

The temperature within the reaction vessel was maintained at 260° F. for 70 hours. The reaction product was then transferred to a specially designed distilling flask and stripped of water, unreacted furfural, and butadiene under a pressure of from two to five mm. of mercury. A residue containing some furfural, and the furfural-butadiene and furfural-butadiene-water condensation products, was transferred to a flask bearing a Vigreaux column and fractionated at pressures in the range 0.5-0.2 mm. of mercury. Initial overhead distillation product was aldehydic in nature. A subsequent, i. e. heavier fraction, was obtained comprising a mixture of white crystals and a red viscous liquid. The crystals which appeared in this fraction had a melting point (crude) of 245° F. to 250° F., a melting point after crystallization of 276° F. and an acidity of 0.0 per cent, an aldehyde content of 0.0 per cent, and a molecular weight of about 189. They were insoluble in pentane and soluble in acetone, water, benzene, methanol, cyclohexane and carbon disulfide.

In the preparation of large quantities of reaction product from butadiene, water, and furfural, in accordance with the procedure above described, the reddish oil, containing the white crystalline product, after standing for a prolonged period of several months contained an increased concentration of white crystals. Fourteen grams of this material boiling at 260-290° F. at 0.5 mm. was redistilled at 0.5 mm. in a 6-inch packed, silvered column. Approximately 1.0 gram of the light reaction product was separated followed by 2.0 grams of a white crystalline solid. The remaining overhead product was a heavy oil. The residue was transferred to a very small flask, but no further crystalline products could be distilled and no crystals separated from the oily overhead material.

The crystalline material was found to melt at 267-268° F. It had a neutralization equivalent of 192. An initial determination of the molecular weight, determined in benzene by the freezing point, was 180, though difficulty was experienced with low solubility. Determination by the Rast camphor method gave a value of 158. The material is soluble in water, alcohol, and dilute sodium hydroxide solution. Preliminary carbon and hydrogen analyses gave C, 64.18 per cent; H, 7.38 per cent; and O, by difference 28.44 per cent. The neutralization equivalent indicates the presence of one potential carboxyl group per molecule.

Further experimental work, not related herein in detail, established the empirical formula of this crystalline product to be $C_9H_{12}O_3$.

Example II 5000 grams of furfural was agitated in a closed reactor with 1000 grams of butadiene and 500 grams of water for 100 hours at about 300° F., air being expelled from the reactor by evaporation of a small excess of butadiene included in the charge. Pressure during the reaction period was about 350 p. s. i. g. At the end of the time, pressure was released and unreacted butadiene allowed to evaporate. The reaction mixture was subjected to distillation under reduced pressure. The first components removed were water and 3-vinyl-1-cyclohexene. The bulk of the distillate was unreacted furfural. When the residue was reduced to a fairly small volume, 2,3,4,5-bis(Δ2-butenylene)-tetrahydrofuran, resulting from the reaction of furfural with butadiene alone, distilled at about 235° F., the pressure for this part of the distillation being reduced to about 1 mm. Hg. A reddish yellow oil was then distilled, forming a semi-solid mass in the receiver which became solid and crystalline upon cooling and standing. This material distilled in the range 250 to 300° F. at 0.5 mm. The yield was 100 grams. This material was predominantly a lactone having the empirical formula of Example I.

Forty grams of the solid thus prepared was admixed with 130 ml. of 85 per cent phosphoric acid and 30 ml. of water. The mixture was heated in an oil bath at 320° F. for 24 hours. At the end of this period the mixture was cooled to a temperature below 200° F. and 20 ml. of water was added. An oil layer was formed, which was removed and, upon cooling to room temperature, contained crystals. The crystals were removed on a filter and recrystallized from water containing a minor proportion of ethanol. A yield of 27 grams, 67.5 per cent by weight, of beta-phenylpropionic acid, based on the lactone starting material, was obtained. This product melted sharply at 114° F.

Example III

Twenty grams of the lactone material produced in the run of Example II was dissolved in 25 ml. of water after which 50 grams of concentrated sulfuric acid was added. This mixture was heated for 16 hours at 320° F. An oil layer was formed and removed, and contained beta-phenylpropionic acid in a yield of 29.3 weight per cent, based on the weight of lactone charged.

Example IV

Thirty grams of the condensation product isolated from the furfural-butadiene-water reaction described in Example II was dissolved in 200 ml. of xylene. 2.5 grams of xylene sulfonic acid was then added. The mixture was refluxed seven hours, the kettle temperature approximating 285° F. Water was separated, and on evaporating of the xylene, an oil layer remained, which did not crystallize on cooling.

This oil was distilled at 1 mm. pressure. The maximum kettle temperature was 400° F. A yield of beta-phenylpropionic acid approximating that of Example III was obtained.

Example V

The tar, from the redistillation of furfural in a furfural rerun unit of an extractive distillation system utilized in the separation of butadiene from butenes, was redistilled under a vacuum of less than 1 mm. The kettle was heated in an oil bath at a temperature gradually increased from 212 to 392° F., 2,3,4,5-bis($\Delta$2-butenylene)-tetrahydrofurfural and the semisolid lactone product of Example II were recovered, the latter in a yield of 25 per cent by weight of the tar. The residue of the tar distillation was brittle black solid furfural polymer.

One hundred grams of the semisolid lactone-containing product from this source, which was a brown, semisolid mass, was admixed with 325 ml. of 85 per cent phosphoric acid and 75 ml. of water and heated 24 hours at 320° F. From the oil layer which separated, a yield of 55 grams of beta-phenylpropionic acid of high purity was recovered.

Example VI

The tar recovered, as described in Example V, was used for preparation of beta-phenylpropionic acid without preliminary separation of the lactone compound.

Six hundred ninety grams of this tar was heated with 500 gms. of 85 per cent phosphoric acid by a current of steam passed through the mixture. The vapors leaving the reaction contained beta-phenylpropionic acid, which was recovered in a high state of purity.

Example VII

Aqueous condensate, rejected from a furfural rerun unit employing steam distillation, along with furfural polymer was concentrated, and an intermediate crude fraction, containing a lactone of the structure (1) illustrated in Example I was insolated. This crude fraction was dark brown, sticky, semisolid and semicrystalline. It contained appreciable amounts of water. Two hundred five grams of this crude material was heated together with 400 grams of 85 per cent phosphoric acid by passing steam through the system. A yield of 15 grams of beta-phenylpropionic acid was obtained.

Example VIII

The water remaining after the separation of a large batch of the crude material of Example VII contained impurities which retarded further crystallization, or separation of the lactone therefrom. The solution was thick and syrupy and was admixed with half its weight of 85 per cent phosphoric acid, and steam distilled at 320° F. A yield of beta-phenylpropionic acid equivalent to 2 per cent of the aqueous solution was obtained in the distillate.

It is to be understood that although we have disclosed a preferred method for the preparation of our lactone starting material, and the formation of same as a by-product in an extractive distillation process, our invention is not limited thereby. It is obviously within the scope of our invention to utilize the lactone described, as a starting material in the manufacture of beta-phenylpropionic acid, regardless of its source.

As will be evident to those skilled in the art, various modifications of this invention can be made, or followed, in the light of the foregoing disclosure and discussion, without departing from the spirit or scope of the disclosure or from the scope of the claims.

We claim:

1. A process for the manufacture of beta-phenylpropionic acid from a lactone having the empirical formula $C_9H_{12}O_3$ and prepared by the condensation of 1,3-butadiene with water and furfural, comprising admixing said lactone with a dehydrating agent and heating the resulting admixture at a temperature within the limits of 150–400° F. for a period within the limits of from 2–40 hours, and recovering beta-phenylpropionic acid from the resulting reaction mixture as a product of the process.

2. A process for the manufacture of beta-phenylpropionic acid, comprising admixing a lactone-containing fraction having a boiling range within the limits of 250 and 300° F. as measured at an absolute pressure not greater than 0.5 mm. Hg and obtained as product of condensation of butadiene, water, and furfural, at a temperature within the limits of 200–300° F. for a period of from 5–125 hours, with a dehydrating acid, maintaining the resulting admixture at a temperature within the limits of 200–350° F. for a period within the limits of from 2–40 hours, and recovering beta-phenylpropionic acid from the resulting reaction mixture as a product of the process.

3. The process of claim 2 wherein said lactone-containing fraction has a boiling range within the limits of 260–290° F. as measured at an absolute pressure not greater than 0.5 mm. of mercury, and wherein said dehydrating acid is phosphoric acid in strength of from 80–90 per cent.

4. The process of claim 2 wherein said admixture is sustained in xylene as solvent and wherein said acid is xylene sulfonic acid.

5. A process for the manufacture of beta-phenylpropionic acid comprising admixing butadiene, water, and furfural to form a reaction mixture containing from 3–50 per cent butadiene and from 1–50 per cent water based on the weight of furfural therein, maintaining the resulting admixture at a temperature in the range of 300–400° F. for a period of from 5–125 hours, recovering from the resulting reaction mixture a residual product fraction containing a lactone having a composition as illustrated by the empirical formula $C_9H_{12}O_3$, admixing said fraction with a dehydrating acid and heating the resulting admixture at a temperature within the limits of 200–350° F. for a contact time within the limits of from 2–40 hours, whereby said lactone is converted to beta-phenylpropionic acid, and recovering beta-phenylpropionic acid as a product of the process.

6. A process for the manufacture of beta-phenylpropionic acid from a lactone having the empirical formula $C_9H_{12}O_3$ and prepared by the condensation of 1,3-butadiene with water and furfural, comprising subjecting said lactone to dehydration by the action of a dehydrating acid at a temperature within the range of from 200–350° F. for a reaction time within the limits of from 5-30 hours, and recovering beta-phenylpropionic acid as a product of the process.

7. A process for the manufacture of beta-phenylpropionic acid, comprising removing water from a steam condensate formed during the steam distillation of furfural previously utilized as a solvent in an extractive distillation of butadiene from a butadiene-butene hydrocarbon mixture conducted under non-anhydrous conditions, contacting a resulting residual steam condensate with a dehydrating acid at a temperature within the limits of 200–350° F. for a contact time within the range of from 2–40 hours, and recovering beta-phenylpropionic acid as a product of the process.

8. A process for the manufacture of beta-phenylpropionic acid comprising diverting a side stream of furfural from an extractive distillation system wherein furfural is employed as a selective solvent under non-anhydrous conditions for the separation of butadiene from a butadiene-butene hydrocarbon mixture, to a furfural purification system and therein separating furfural of high purity and a tarry residual by-product formed as an impurity during said extractive distillation, admixing said tarry residue with a dehydrating acid for a period within the limits of from 2–40 hours at a temperature in the range of from 200–350° F., and recovering beta-phenylpropionic acid as a product of the process.

9. The process of claim 8 wherein said acid is 80–90 per cent phosphoric acid.

10. A process for the manufacture of beta-phenylpropionic acid comprising introducing butadiene, water, and furfural into a reaction zone to provide a resulting admixture containing from 3–50 per cent butadiene and from 1–30 per cent water based on the weight of furfural, maintaining the resulting admixture at a temperature within the limits of from 200–300° F. for a time within the limits of from 5–125 hours, recovering a product fraction from the resulting reaction mixture containing a lactone having a composition in accordance with the empirical formula $C_9H_{12}O_3$, admixing the lactone-containing fraction thus recovered with xylene as a solvent, introducing xylene sulfonic acid to the resulting xylene solution in a weight ratio to said lactone-containing fraction within the limits of 0.01:1 to 1:1, heating the resulting xylene-lactone-acid admixture under reflux conditions at a boiling temperature within the range of from 270–290° F. for a period of from 5–10 hours, removing xylene from the resulting reaction mixture, and recovering beta-phenylpropionic acid from the xylene-free reaction product.

11. The process of claim 10 wherein beta-phenylpropionic acid is recovered from said xylene-free reaction mixture by extraction in water and is subsequently recrystallized from said water.

12. A process for the manufacture of beta-phenylpropionic acid from a lactone having the empirical formula $C_9H_{12}O_3$ and prepared by the condensation of 1,3-butadiene with water and furfural, comprising heating said lactone in the presence of xylene sulfonic acid at a temperature within the range of 200–350° F. for a period of from 5–10 hours, and recovering beta-phenylpropionic acid as a product of the process.

13. A process for the manufacture of beta-phenylpropionic acid from a lactone having the empirical formula $C_9H_{12}O_3$ and prepared by the condensation of 1,3-butadiene with water and furfural, comprising heating said lactone in the presence of 80–90 per cent phosphoric acid at a temperature within the range of 200–350° F. for a period of from 15–36 hours, and recovering beta-phenylpropionic acid as a product of the process.

14. A process for the manufacture of beta-phenylpropionic acid from a lactone having the empirical formula $C_9H_{12}O_3$ and prepared by the condensation of 1,3-butadiene with water and furfural, comprising heating said lactone in the presence of 90–95 percent sulfuric acid at a temperature within the range of 200–350° F. for a period of from 5–30 hours, and recovering beta-phenylpropionic acid as a product of the process.

JOHN C. HILLYER.
JAMES T. EDMONDS.

REFERENCES CITED

The following references are of record in the file of this patent:

UNITED STATES PATENTS

| Number | Name | Date |
|---|---|---|
| 2,372,668 | Hackmuth | Apr. 3, 1945 |
| 2,416,500 | Searth | Feb. 25, 1947 |
| 2,419,039 | Searth | Apr. 15, 1947 |

OTHER REFERENCES

Dunlap: "Ind. and Eng. Chem.," vol. 40, pages 204–209 (1948).